US009260207B2

(12) United States Patent
Razumov

(10) Patent No.: US 9,260,207 B2
(45) Date of Patent: Feb. 16, 2016

(54) ORDER PICKING SYSTEM AND METHOD

(71) Applicant: Sergey N. Razumov, Moscow (RU)

(72) Inventor: Sergey N. Razumov, Moscow (RU)

(73) Assignee: Sergey N. Razumov, Moscow (RU)

( * ) Notice: Subject to any disclaimer, the term of this patent is extended or adjusted under 35 U.S.C. 154(b) by 432 days.

(21) Appl. No.: 13/744,245

(22) Filed: Jan. 17, 2013

(65) Prior Publication Data

US 2014/0199150 A1    Jul. 17, 2014

(51) Int. Cl.
| | |
|---|---|
| *B65G 1/137* | (2006.01) |
| *B65B 5/10* | (2006.01) |
| *B65B 5/08* | (2006.01) |
| *B65B 35/18* | (2006.01) |
| *B65G 47/91* | (2006.01) |

(52) U.S. Cl.
CPC . *B65B 5/08* (2013.01); *B65B 5/105* (2013.01); *B65B 35/18* (2013.01); *B65G 1/1378* (2013.01); *B65G 47/912* (2013.01)

(58) Field of Classification Search
CPC ........ B65G 21/00; B65G 21/10; B65G 21/12; B65G 47/912; B65G 49/00; B65G 49/05; B65G 49/061; B65B 5/08; B65B 5/105; B65B 35/18
USPC ............. 414/217, 217.1, 684.3, 749.1, 751.1, 414/752.1, 940, 941, 805
See application file for complete search history.

(56) References Cited

U.S. PATENT DOCUMENTS

| | | | |
|---|---|---|---|
| 6,900,878 B2 * | 5/2005 | Okubo et al. ................... 355/53 |
| 2005/0056441 A1 * | 3/2005 | Rider et al. ................. 174/35 R |
| 2006/0126052 A1 * | 6/2006 | Matsutori et al. .............. 355/75 |
| 2008/0024749 A1 * | 1/2008 | Williams et al. ................ 355/72 |
| 2008/0041760 A1 * | 2/2008 | Durben et al. ................ 206/710 |
| 2009/0028673 A1 * | 1/2009 | Bonora et al. ............. 414/217.1 |
| 2010/0126904 A1 * | 5/2010 | Cheng et al. .................. 206/710 |

FOREIGN PATENT DOCUMENTS

| | | |
|---|---|---|
| DE | 1109595 B | 6/1961 |
| FR | 2699140 A1 | 6/1994 |

OTHER PUBLICATIONS

International Search Report issued in International Application No. PCT/IB2014/000015 dated May 16, 2014.

* cited by examiner

*Primary Examiner* — Ernesto Suarez
*Assistant Examiner* — Ashley Romano
(74) *Attorney, Agent, or Firm* — McDermott Will & Emery LLP

(57) ABSTRACT

An order picking system having a system for transferring an article from a source container to a reception container. A article holder is configured for taking the article from the source container and placing the article into the reception container. A protection case is movable between a source position above the source container and a reception position above the reception container. A gate is configured to provide an opening in a bottom portion of the protection case when the gate is in an open state, and to close the opening when the gate is in a closed state. The protection case is configured for moving from the source position to the reception position when the article holder transfers the article from the source container to the reception container. The article holder is configured to hold the article above the bottom portion of the protection case when the article holder is moved from the source container to the reception container.

8 Claims, 6 Drawing Sheets

ORDER PICKING SYSTEM AND METHOD

TECHNICAL FIELD

This disclosure relates to retail logistics, and more particularly, to system and method for order picking in a retail store or warehouse.

BACKGROUND ART

Order picking operations involve extracting specified goods from a storage system in a retail facility or a warehouse, and collecting them, for example, to prepare customers orders. Order picking processes have become the most labor-intensive and costly part of the supply chain for any warehouse or retail environment, where the cost of order picking is estimated to be as much as 55% of the total operating expense. This makes order picking one of the most controlled logistic processes.

Known order picking systems perform effective collection of goods having a regular shape, such as goods packed in rectangular packages. However, for goods having irregular shapes, such as grocery products, known order picking systems are less effective. For example, articles having irregular shapes cannot be firmly held by the picking mechanism. Therefore, they can fall from the picking mechanism during transfer from one box to another. In addition, instead of one article required for the customer's order, multiple articles can be taken from a box.

Therefore, it would be desirable to develop novel order picking system and method capable of handling articles having irregular shapes.

SUMMARY OF THE DISCLOSURE

In accordance with one aspect, the present disclosure offers an order picking system having a system for transferring an article from a source container to a reception container. An article holder, such as a gripper, is configured for taking the article from the source container and placing the article into the reception container. A protection case is movable between a source position above the source container and a reception position above the reception container. A gate is configured to provide an opening in a bottom portion of the protection case when the gate is in an open state, and to close the opening when the gate is in a closed state. The protection case is configured for moving from the source position to the reception position when the article holder transfers the article from the source container to the reception container. The article holder is configured to hold the article above the bottom portion of the protection case when the article holder is moved from the source container to the reception container.

In an exemplary embodiment, the article holder may have a suction cup for holding the article. A first actuator mechanism may move the article holder in three mutually perpendicular directions, and a second actuator mechanism may move the protection case between the source position and the reception position.

The gate may be switched from the open state into the closed state when the article holder takes the article from the source container. The gate may be switched from the closed state to the open state when the article holder is placed above the reception container.

A position control system may check a position of the article held by the article holder. The article holder may be configured for taking the article from the protection case when the position control system indicates that the article is not held by the article holder.

In an alternative embodiment, the article holder may be configured for taking articles from multiple source containers and the protection box may be configured for moving from multiple source positions to the reception position.

In a further exemplary embodiment, the article holder may be configured for placing articles into multiple reception containers and the protection box may be configured for moving from a source position to multiple reception positions.

In accordance with a method of the present disclosure the following steps are carried out for transferring an article from a source container to a reception container using a protection case and a gate configured to provide an opening in a bottom portion of the protection case when the gate is in an open state, and to close the opening when the gate is in a closed state:

placing the gate into the open state to take the article from the source container via the opening in the protection case using an article holder, placing the gate into the closed state when the article holder raises the article above the bottom portion of the protection case, moving the article holder with the article from a position above the source container to a position above the reception container when the gate is in the closed state, at the same time, moving the protection case from the position above the source container to the position above the reception container so as to maintain the article above the bottom portion of the protection case, and switching the gate into the open state to place the article to the reception container via the opening in the protection case.

The article holder may be movable in thee mutually perpendicular directions. A position of the article may be checked to determine when the article falls from the article holder. The article may be taken from the protection case if the article falls from the article holder.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using specific examples of an order picking system described in the present disclosure. It will become apparent, however, that the concept of the disclosure is applicable to any system for transferring goods from one position to another.

Figure 1:
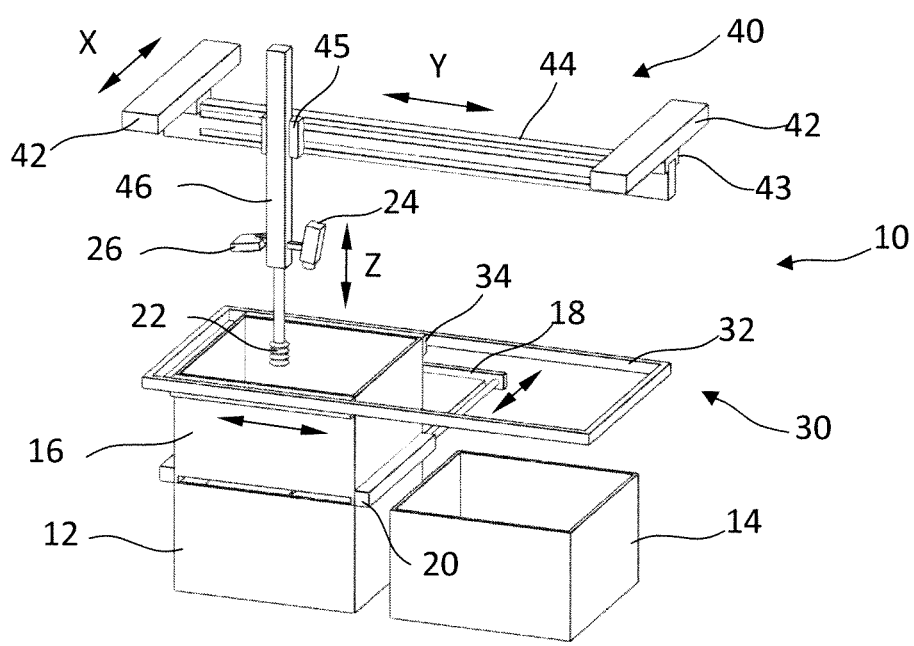
FIG. 1 shows an exemplary embodiment of an order picking system in accordance with the present disclosure.

FIG. 1 shows an exemplary order picking system 10 that takes a product from a source container 12 and places the taken product to a reception container 14. As shown in FIG. 1, the containers 12 and 14 may be boxes for storing products. However, as one skilled in the art would realize, the order picking system 10 is able to operate with any kind of containers, for example, with pallets or trays.

For example, the source container 12 may hold multiple similar articles, such as grocery products, stored in a storage systems. The reception container 14 may be used for collecting a specific customer's order including different articles that may be collected from different source containers 12.

The order picking system 10 includes a protection case 16 movable from a source position in which the order picking system 10 picks an article, to a reception position in which the order picking system places the picked article. The source container 12 is provided below the case 16 when the protection case 16 is in the source position, and the reception container 14 is placed below the protection case 16 when the protection case 16 is in the reception position. The bottom surface of the protection case 16 includes a gate 18 which has an open state to provide opening in the bottom portion of the protection case 16 sufficient to allow the picking system 10 to access the source container 12. For example, the opening may be provided at the bottom surface of the protection case 16. Also, the gate 18 has a closed state in which the opening in the bottom portion of the protection case 16 is closed. For example, the gate 18 may be made as a sliding door that moves along the bottom surface of the protection case 16 between the open and closed positions. A linear actuator 20 may be provided for switching the gate 18 between the open and closed states, for example, by opening and closing the gate 18. As shown in FIG. 1, a pneumatic cylinder may be used as the linear actuator 20.

A linear actuator 30 may be provided for moving the protection case 16 between the source position and the reception position. The linear actuator 30 may have guides 32 and movable carriages 34. The protection case 16 may be fixed at the carriages 34 for moving along the guides 32.

An article holder, such as a gripper 22, may be provided for picking products from the source container 12, holding them when they are moved to the position of the reception container 14, and placing the products to the reception container 14. For example, the gripper 22 may include one or more suction cups that use negative fluid pressure of air to adhere to a surface of a product in the source container 12. Conventional vacuum pumps, vacuum blowers or ejectors (not shown) may be used for creating air pressure required for operation of the suction cups.

The gripper 22 may be movable by a manipulator 40 along three mutually perpendicular directions X, Y and Z shown in FIG. 1. The manipulator 40 may include three linear actuators for providing movements along the X, Y and Z directions. A linear actuator 42 moves the gripper 22 in the X direction. The actuator 42 may be fixed at the frame of the order picking system 10. Movable carriages 43 may be provided on the actuator 42 for carrying a linear actuator 44 that moves the gripper 22 in the Y direction. The linear actuator 44 may include a movable carriage 45 that carries a linear actuator 46 provided to move the gripper 22 in the Z direction.

A vision system 24 including a video camera may be fixed at the actuator 46 to identify a product to be picked up from the source container 12. Also, a position control system 26, such as a position sensor, may be fixed at the actuator 46 to monitor position of a product held by the gripper 22.

Figure 2:
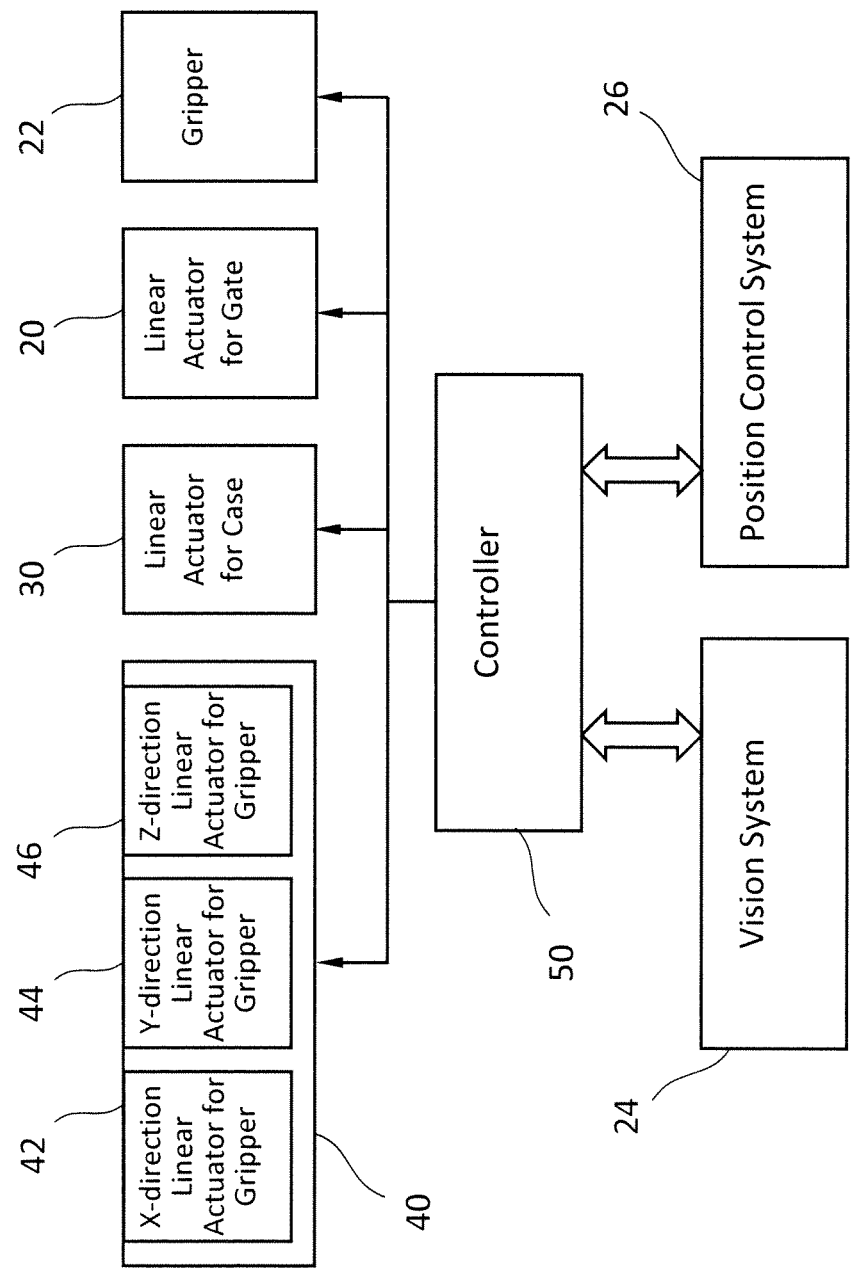
FIG. 2 shows a simplified block diagram that illustrates elements for carrying out various operations performed by the order picking system.

FIG. 2 is a simplified diagram that illustrates elements for performing various operations performed by the order picking system 10. The operations of system 10 are controlled by a controller 50 that may include a data processor responsive to external commands for processing the commands and producing various control signals. The controller may have an interface for providing bidirectional data communications with external objects and elements of the order picking system 10. In particular, the controller 50 may control operations of the linear actuator 20 that moves the gate 18, the gripper 22, the vision system 24, the position control system 26, the linear actuator 30 that moves the protection case 16, and the linear actuators 42, 44 and 46 that move the gripper 22 in X, Y and Z directions, respectively. Also, the controller 50 may receive information from the vision system 24 and the position control system 26.

The order picking system 10 operates as follows. In an initial position illustrated in FIG. 1, the protection case 16 is placed in the source position with an open gate 18. The source container 12 is provided below the protection case 16 and may contain multiple similar articles, at least one of which should be included in a particular customer's order.

The controller 50 controls the linear actuators 42, 44 and 46 of the manipulator 40 to move the gripper 22 inside the protection case 16 until the vision system 24 carried by the actuator 46 selects a desired article to be picked. When a desired article is selected, the vision system 24 transmits to the controller 50 information on the position of the selected article. In response the controller 50, controls the linear actuators 42 and 44 to position the gripper 22 above the selected article, and controls the linear actuator 46 to move the gripper 22 down in a vertical direction via the opening in the bottom surface of the protection case 16. When the gripper 22 is positioned directly above the article, the controller 50 controls the gripper 22 to activate suction cups on the gripper 22 so as to take the article from the source container 12.

Figure 3:
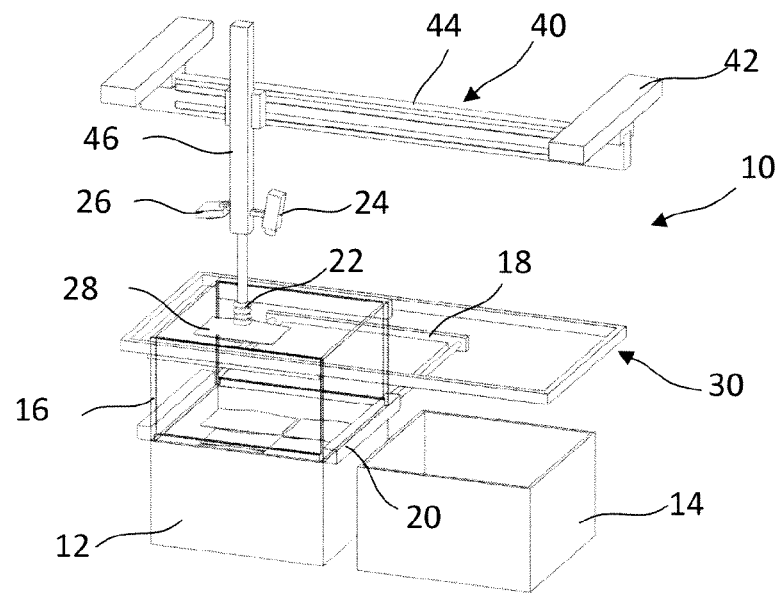
FIGS. 3-7 illustrate operation of the order picking system.

As illustrated in FIG. 3, the gripper 22 may raise a selected article 28 to a predetermined level above the horizontal level of the gate 18, i.e. above the bottom surface of the protection box 16. The position control system 26 checks the position of the article 28 to make sure that the article 28 is attached to the gripper 22.

Figure 4:
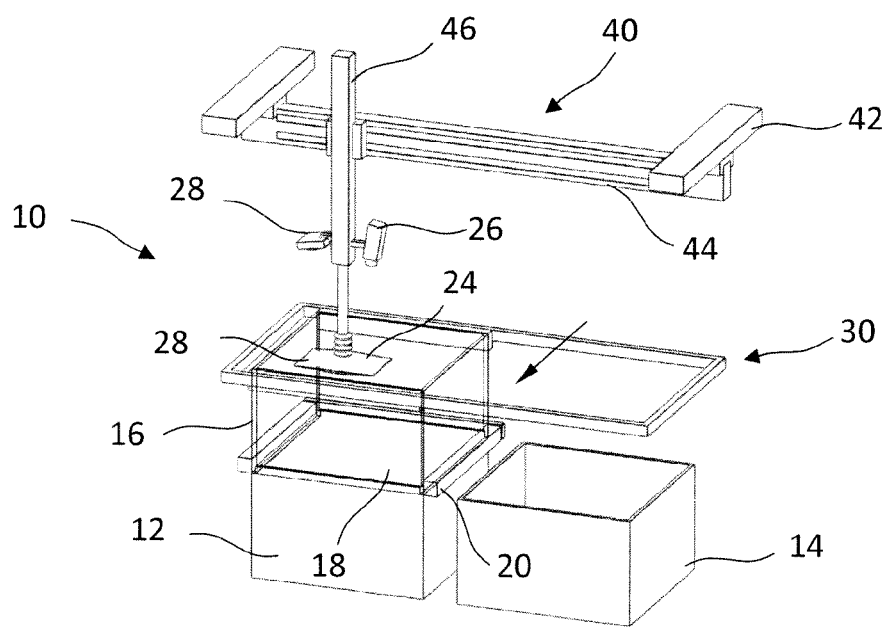
Figure 5:
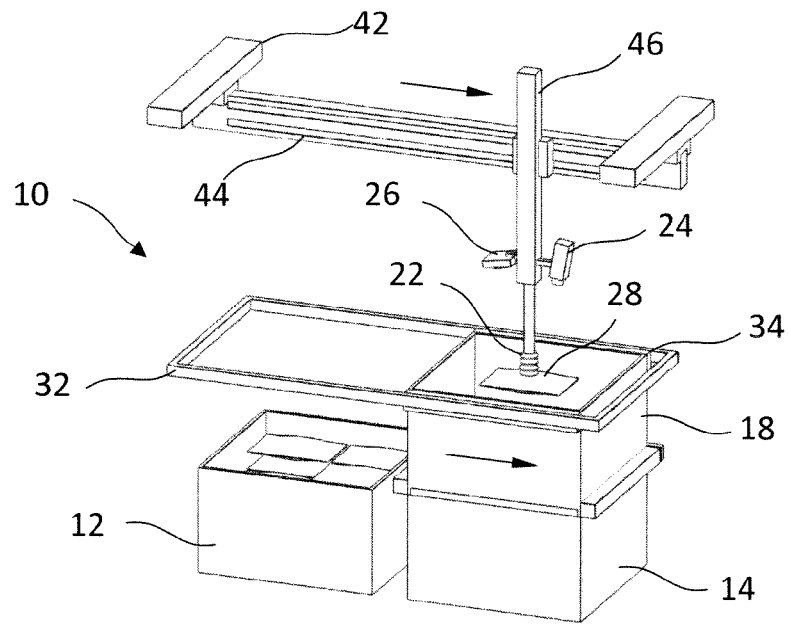

As shown in FIG. 4, when the article 28 is raised to the predetermined level, the controller 50 controls the linear actuator 20 to place the gate 18 into a closed state so as to close the opening in the bottom surface of the protection case 16. Thereafter, as shown in FIG. 5, the controller 50 controls the linear actuator 30 that moves the protection case 16 along the guides 32 into the reception position above the reception container 14. At the same time, the controller 50 controls actuators 42 and 44 so as to move the gripper 22 with the article 28 inside the protection case 16 synchronously with the movement of the protection case 16. When the gripper 22 is being moved, the position control system 26 continues to check the position of the article 28.

If for some reason, the article 28 falls from the gripper 22, the closed gate 18 would prevent the article 28 from falling outside of the protection case 16. When the position control system 26 determines that the article 28 is not attached to the gripper 22, the system 26 informs the controller 50 which controls the linear actuators 42, 44 and 46 and the gripper 22 to take the article 28 from the protection case 16.

Figure 6:
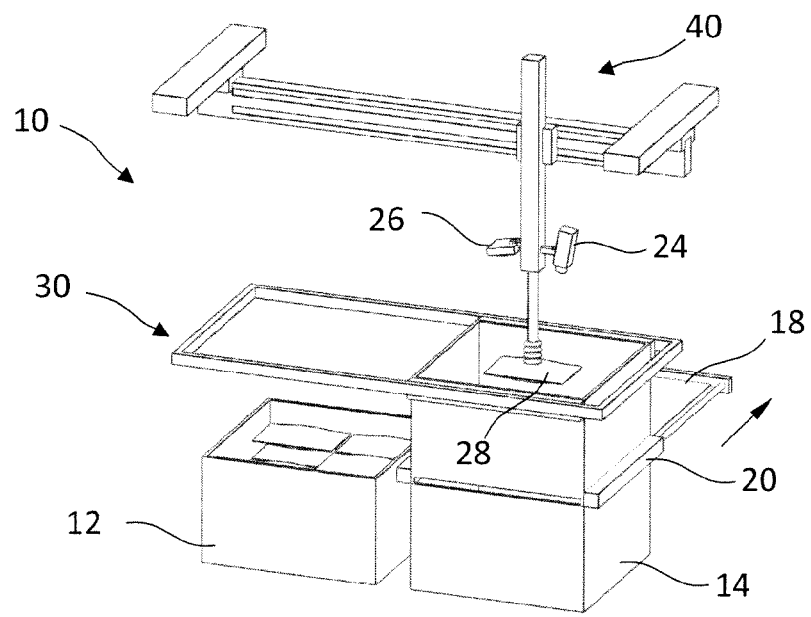
Figure 7:
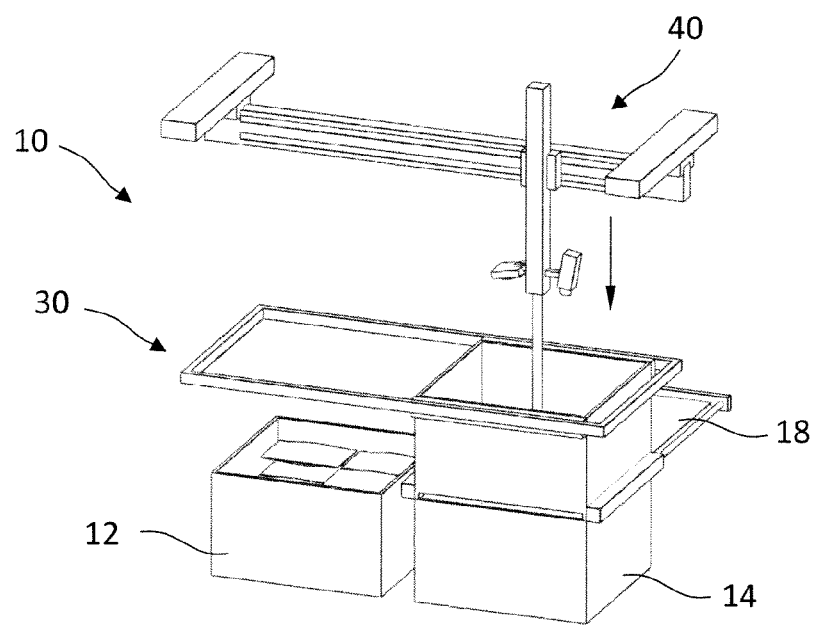

As shown in FIG. 6, when the protection case 16 is positioned above the reception container 14, the controller 50 controls the actuator 20 to open the gate 18 so as to provide an opening at the bottom surface of the protection case 16. The vision system 24 may select a specific position in the reception container 14 for placing the article 28. As illustrated in FIG. 7, based on the information from the vision system 24, the controller 50 may control the linear actuators 42, 44 and 46 and the gripper 22 to place the article 28 into the selected position in the reception container 14 via the opening at the bottom surface of the protection case 16.

Thereafter, another article from the source container 12 can be transferred to the reception container 14 in a similar manner. Alternatively, another source container with articles required to fulfill the customer's order may be placed into the source position, and the order picking system 10 may transfer that article to the reception container 14 in a manner described above. The order picking procedure is continued until all articles required to fulfill a particular customer's order are placed into the reception container 14.

Hence, the order picking system 10 performs an automatic order picking procedure to collect all articles for a particular customer's order, and allows articles of irregular shape to be collected. The protection case 16 with the gate 18 prevents an article lost by the gripper 22 during the order picking procedure, from falling outside of the protection case 16.

Figure 8:
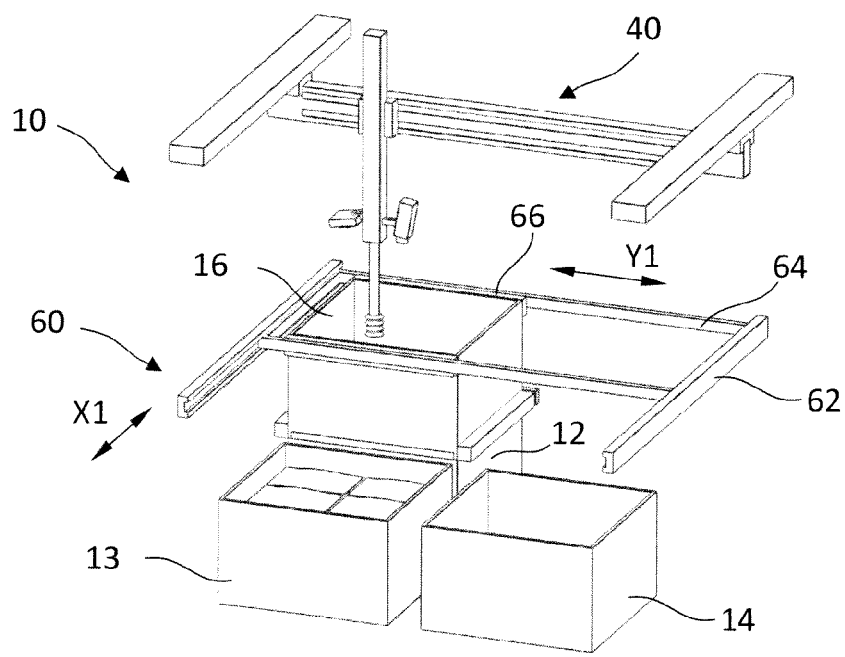
FIGS. 8 and 9 illustrates an alternative exemplary embodiment of the order picking system.
Figure 9:
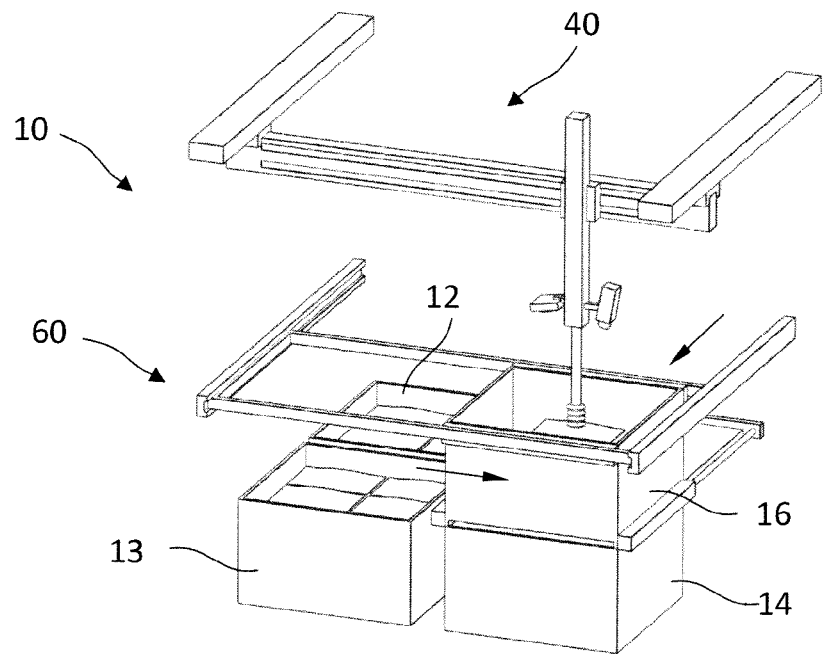

FIGS. 8 and 9 illustrate another exemplary embodiment of the order picking system 10 in which two source containers 12 and 13 are employed. Instead of the linear actuator 30 shown in the embodiment in FIG. 1, the order picking system 10 in FIG. 8 includes a two-directional linear actuator 60 for moving the protection case 16 in two directions X1 and Y1 shown in FIG. 8. The actuator 60 may include fixed guides 62 attached to the frame of the system 10, and guides 64 movable along the guides 62. Movable guides 64 may be formed as a frame. The protection case 16 may be held by carriages 66 movable along the X1 and Y1 directions. The actuator 60 is configured for moving the protection case 16 from any of the positions above the source containers 12 and 13 to the positions above the reception container 14. Although two source containers are illustrated in FIGS. 8 and 9, one skilled in the art would realize that the order picking system 10 in FIGS. 8 and 9 is able to collect articles from any number of source containers at the same time.

Figure 10:
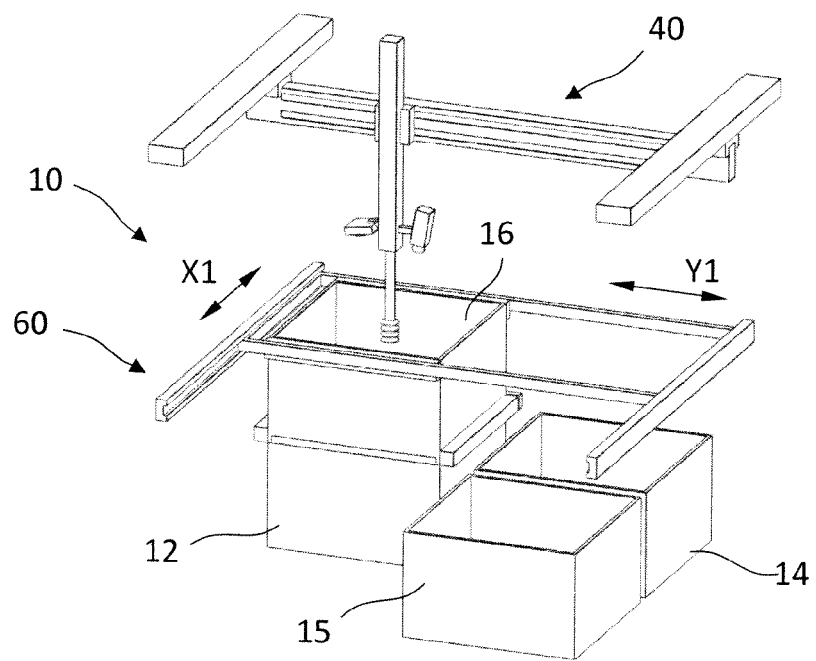
FIG. 10 illustrates a further exemplary embodiment of the order picking system.

FIG. 10 illustrate a further exemplary embodiment of the order picking system 10 in which two reception containers 14 and 15 are employed. The actuator 60 is configured for moving the protection case 16 from the position above the source container 12 to any of the positions above the reception containers 14 and 15. Although two reception containers are illustrated in FIGS. 8 and 9, one skilled in the art would realize that the order picking system 10 in FIGS. 8 and 9 is able to place articles in any number of reception containers so as to collect multiple customer's orders at the same time.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A system for transferring an article from a source container to a reception container, comprising:
   an article holder configured for taking the article from the source container and placing the article into the reception container,
   a protection case movable between a source position above the source container and a reception position above the reception container,
   a gate configured to provide an opening in a bottom portion of the protection case when the gate is in an open state, and to close the opening when the gate is in a closed state, the protection case being configured for moving from the source position to the reception position when the article holder transfers the article from the source container to the reception container, and
   a position control system for checking a position of the article held by the article holder,
   the article holder being configured to hold the article above the bottom portion of the protection case when the article holder is moved from the source container to the reception container, and
   the article holder being further configured for taking the article from the protection case when the position control system indicates that the article is not held by the article holder.

2. The system of claim 1, wherein the article holder has a suction cup for holding the article.

3. The system of claim 1, further including a first actuator mechanism for moving the article holder in three mutually perpendicular directions.

4. The system of claim 3, further including a second actuator mechanism for moving the protection case between the source position and the reception position.

5. The system of claim 1, wherein the gate is switched from the open state into the closed state when the article holder takes the article from the source container.

6. The system of claim 5, wherein the gate is switched from the closed state to the open state when the article holder is placed above the reception container.

7. The system of claim 1, wherein the article holder is configured for taking articles from multiple source containers and the protection box is configured for moving from multiple source positions to the reception position.

8. The system of claim 1, wherein the article holder is configured for placing articles into multiple reception containers and the protection box is configured for moving from a source position to multiple reception positions.

* * * * *